Nov. 10, 1953
R. KAISER
2,658,808
SEALING STRUCTURE
Filed June 23, 1950
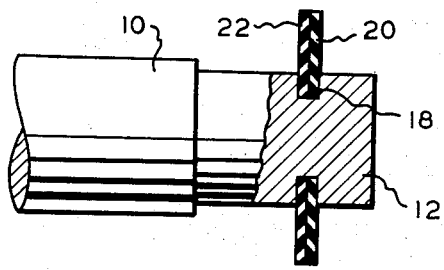
FIG. I.
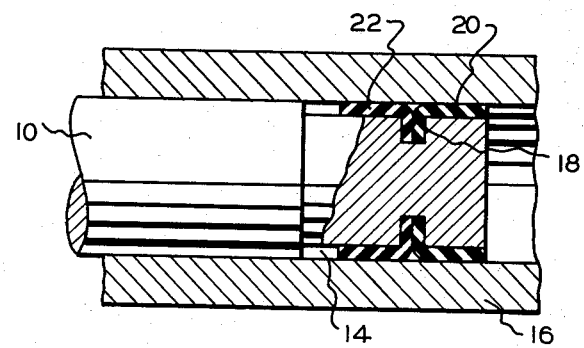
FIG. II.
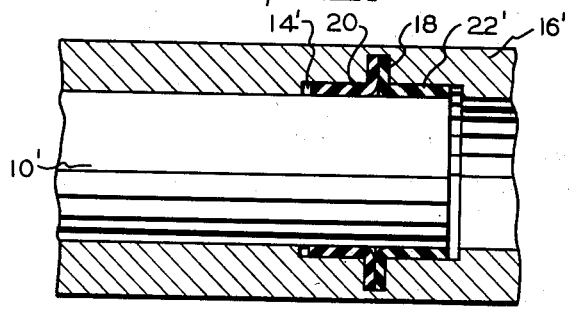
FIG. III.
INVENTOR
RUDOLF KAISER
BY Townsend Beaman
ATTORNEY Patented Nov. 10, 1953

2,658,808

UNITED STATES PATENT OFFICE 2,658,808

SEALING STRUCTURE

Rudolf Kaiser, Ettlingen, Baden, Germany, assignor to Aeroquip Corporation, Jackson, Mich., a corporation of Michigan Application June 23, 1950, Serial No. 169,897

1 Claim. (Cl. 309—23)

The present invention relates to piston sealing structure.

An object of this invention is to provide a seal which may be manufactured in an inexpensive manner without reducing the quality of the seal.

In general the sealing structure takes the form of one or more annular discs of rubber, natural or synthetic, or similar material. A groove is provided in either the piston or the cylinder in which a peripheral edge of the disc is rolled or pressed to secure the same. The disc is then axially displaced and disposed in a cavity between the piston and cylinder.

In the drawings:

Fig. I is an elevational view, partly in section of a piston embodying the invention, Fig. II shows the piston of Fig. I in a cylinder, and Fig. III is a modified form of the invention applied to the cylinder.

As shown in Figs. I and II, the piston 10 has an axially extending reduced portion 12 to form a cavity or relief 14 with the wall of the cylinder 16. An annular groove 18 in the portion 12 receives the inner peripheral edge of the sealing discs 20 and 22. Prior to insertion of the piston 10 into the cylinder 16, the discs 20 and 22 assume their unstressed position as shown in Fig. I. When the piston 10 is inserted into the cylinder 16, the discs 20 and 22 are axially folded or displaced in opposite directions along the piston 10. As shown in Fig. II, the axially folded or displaced portions of the discs 20 and 22 are displaced in the cavity or relief 14 between the piston 10 and cylinder 16.

It will be understood that the radial dimension of the cavity 14 approximates the thickness of the discs 20 and 22. Also, when sealing is required only in one direction one or the other of the discs 20 and 22 may be omitted, depending upon the direction of sealing required.

Referring to Fig. III, the groove 18' is provided in the wall of the cylinder 16' and opens radially into an axially extending counterbore providing a cavity or relief 14' between the cylinder 16' and piston 10'. In the modified form of the invention, the outer peripheral edges of the discs 20' and 22' are rolled, pressed or otherwise secured in the groove 18' and then axially folded or displaced along the cavity or relief 14'.

Having thus described my invention what I claim and desire to protect by Letters Patent is:

Sealing structure for sealing a piston and cylinder assembly comprising a piston having an annular groove, an axially extending annular relief in said piston into which said annular groove radially opens, a pair of flexible sealing rings in the form of flat unformed annular discs having inner and outer peripheral edges, said inner edges being disposed in said groove, the remaining portion of said discs being foldable axially of said piston in opposite directions upon insertion of the piston into the cylinder and disposed in said relief to provide a seal between said piston and cylinder.

RUDOLF KAISER.

References Cited in the file of this patent

UNITED STATES PATENTS

| Number | Name | Date |
|---|---|---|
| 390,225 | Guels | Oct. 2, 1888 |
| 683,252 | Crawford | Sept. 24, 1901 |
| 1,053,678 | Swanson | Feb. 18, 1913 |
| 1,306,034 | Tips | June 10, 1919 |
| 2,088,357 | Wuestefeldt | July 27, 1937 |
| 2,214,261 | Roth | Sept. 10, 1940 |

FOREIGN PATENTS

| Number | Country | Date |
|---|---|---|
| 494,123 | France | May 26, 1919 |
| 606,218 | France | June 9, 1926 |
| 291,444 | German | Apr. 18, 1916 |